(No Model.)
D. T. CROCKETT.
COMBINED STRAINER AND DISCHARGE COCK FOR VARNISH TANKS.
No. 435,921. Patented Sept. 9, 1890.
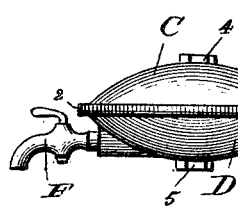
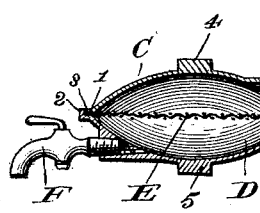
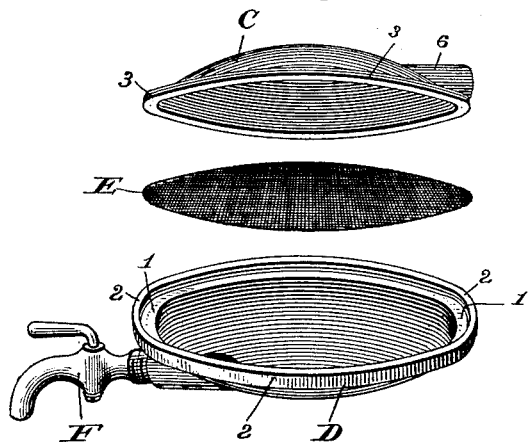
WITNESSES:
INVENTOR
David T. Crockett
BY  ATT'Y

UNITED STATES PATENT OFFICE.

DAVID T. CROCKETT, OF BRIDGEPORT, CONNECTICUT.

COMBINED STRAINER AND DISCHARGE-COCK FOR VARNISH-TANKS.

SPECIFICATION forming part of Letters Patent No. 435,921, dated September 9, 1890.

Application filed January 18, 1890. Serial No. 337,337. (No model.)

*To all whom it may concern:*

Be it known that I, DAVID T. CROCKETT, a citizen of the United States, residing at Bridgeport, in the county of Fairfield and State of Connecticut, have invented certain new and useful Improvements in Combined Strainers and Discharge-Cocks for Varnish-Tanks; and I do hereby declare the following to be a full, clear, and exact description of the invention, such as will enable others skilled in the art to which it appertains to make and use the same.

My invention has reference to a certain new and useful improvement in combined strainer and discharge-cock for varnish-tanks, and has for its object not only to strain the varnish and thereby free it from all skin and lumps of gum or foreign substance, but also to do away with the necessity of shutting off the supply-stream from the tanks whenever a can is filled, thereby greatly facilitating the operation of canning and preventing the continual agitation of the sediment at the bottom of the tank.

In drawing off varnish from a large tank into small cans it has hitherto been impracticable to utilize any local straining device, for the reason that the pressure on the cock has been so great that the continual shutting off of said pressure when a can has been filled so agitated the varnish in the tank that the sediment was commingled with the varnish, the result being that the sediment and foreign particles would speedily clog the strainer, and thereby stop the flow of the varnish. In fact whenever it has been attempted hitherto to use a strainer in combination with the local discharge-cock at the bottom of the tank it has been necessary to clean said strainer so often that the waste of time and the expense thus incurred have compelled varnish manufacturers to discard entirely all straining devices. Again, in drawing varnish from a large tank into small cans it has been necessary to fill said cans with a full pressure of varnish against the discharge-cock, and when the supply was shut off at the filling of each can there was more or less drip and consequent waste from the said cock.

I have ascertained by practical experiments that a strainer to be of avail in drawing off varnish must be of an expansive area, so that the varnish may flow over the same, and also that the steady flow of varnish from the supply-tank must not be checked during the operation of filling cans for market use, and, bearing these points in mind, my invention will be readily understood from the following description, supplemented by the accompanying drawings, which form a part of this specification, in which—

Figure 1 is a side elevation showing a varnish-tank with my improvement attached thereto; Fig. 2, a sectional elevation thereof, and Fig. 3 a detail perspective of the component parts of my strainer in detached condition.

Similar letters denote like parts in the several figures of the drawings.

A is a supply-tank, which is provided with an outlet-cock B leading from a point near the bottom of said tank.

C D are two shells, which I prefer to make in the form of spherical segments, both on account of the general appearance and strength thereby afforded, and for the reason that such form insures lightness in weight and convenience in handling, although the shape is immaterial so far as the successful operation of my improvement is concerned, it being necessary only that said shells should have an extensive area. The lower shell D has an annular seat 1 near the periphery of its upper edge and a circumferential lip 2 extending upwardly immediately beyond said seat, the inner wall of said lip being threaded for the purpose presently set forth. The lower edge of the upper shell C is extended in a horizontal plane to form an annular flange 3, the outer edge whereof is threaded to correspond with the thread on the lip 2 as male and female.

E is the strainer, which may be made from wire-cloth, ordinary cloth fabric, or any suitable material which will answer the purpose, although I prefer the wire-cloth, as it is stronger and easier to clean and manipulate in assembling than any other material that I know of. This strainer is of a size and area sufficient to extend across the lower shell and rest upon the annular seat 1. The shells being threaded, as above set forth, are screwed together firmly, the strainer being confined and secured between the flange 3 and seat 1.

Wrench-holds 4 5 are provided at the top and bottom of the shells C D, respectively, to facilitate the joining of said shells. The upper shell is provided with a threaded bearing 6, within which the end of the cock B is screwed, while a discharge-cock F is tapped within the lower shell, whereby the varnish is drawn into the cans.

The operation of my improvement is as follows: The cock B is opened to allow varnish to flow from the tank within the receptacle formed by the shells C D and over the strainer E, and a can is placed beneath the cock F. The strained varnish will flow from the shell D through the cock F within the can until the latter is filled. The workman now removes the filled can and places the nozzle of an empty can beneath the cock F without shutting off the latter, and this can readily be accomplished without spilling a drop of varnish, for the simple reason that there is no pressure to speak of within the shells, the supply from the cock B being regulated by the discharge through the cock F. In fact the pressure is all on the cock B, and the receptacle formed by the shells is never filled, so that it will be readily understood that there can be no agitation of the sediment at the bottom of the tank, because the steady flow of the varnish is never interrupted until said tank is dry. Again, the cutting off of the discharge of varnish by the closing of the cock F would not disturb the sediment, for the reason that the flow through the cock B would continue until it was gradually stopped by the gradual increase of the air-pressure within the shells.

It is not necessary to provide each of a series of varnish-tanks with my improvement, since the latter may be quickly detached from the outlet-cock of one tank and readily attached to the outlet-cock of another tank.

In cleaning the strainer the lower shell may be detached from the upper shell without removing the latter from its connection with the tank, and said strainer then cleaned, replaced, and the shells attached, as hereinbefore set forth.

Having thus described my invention, what I claim as new, and desire to secure by Letters Patent, is—

A combined strainer and discharge-cock for varnish-tanks, consisting of two shells secured together, one above the other, a strainer extending horizontally between said shells and secured between the edges thereof, and a discharge-cock tapped within the outer side wall of the lower shell, in combination with the outlet-cock from the tank tapped within the inner side wall of the upper shell, substantially as set forth.

In testimony whereof I affix my signature in presence of two witnesses.

DAVID T. CROCKETT.

Witnesses:
F. W. SMITH, Jr.,
J. S. FINCH.